Patented Sept. 23, 1924.

1,509,442

UNITED STATES PATENT OFFICE.

JAMES P. PENNY, OF BUFFALO, NEW YORK, ASSIGNOR TO NATIONAL ANILINE & CHEMICAL COMPANY, INC., OF NEW YORK, N. Y., A CORPORATION OF NEW YORK.

AZO DYES.

No Drawing. Application filed July 13, 1922. Serial No. 574,789.

*To all whom it may concern:*

Be it known that I, JAMES P. PENNY, a citizen of the United States, residing at Buffalo, in the county of Erie, State of New York, have invented certain new and useful Improvements in Azo Dyes; and I do hereby declare the following to be a full, clear, and exact description of the invention, such as will enable others skilled in the art to which it appertains to make and use the same.

This invention relates to the production of new azo dyes which are of value for dyeing cotton and other vegetable fibres. The dyed fabrics, or other material, dyed with the new dyestuffs also form a part of the present invention.

The new dyestuffs can be obtained by combining two molecular proportions of a diazotized aminoazosulfonic acid of the benzene series, such as diazotized aminoazobenzenedisulfonic acid, or aminoazotoluenedisulfonic acid, with one molecular proportion of 5.5'-dihydroxy-2.2'-dinaphthylurea-7.7'-disulfonic acid (i. e., symmetrical urea derivative of 2.5-aminonaphthol-7-sulfonic acid).

The following specific example will further illustrate the invention, but it is understood that the invention is not limited thereto. The parts are by weight.

160.5 parts of the di-sodium salt of 4-aminoazobenzene-3.4'-disulfonic acid are dissolved in 1000 parts of water and diazotized in the usual manner at a temperature of about 10° C. with the aid of 130 parts hydrochloric acid of 20° Bé. and 28 parts of sodium nitrite. The resulting diazo solution is then stirred into a cold solution prepared by dissolving 110 parts of the sodium salt of 5.5'-dihydroxy-2.2'-dinaphthylurea-7.7'-disulfonic acid in 1000 parts of water. Whilst stirring the mixture, which is maintained at a temperature of about 15° C., there is slowly and gradually added a strong aqueous solution of sodium carbonate until the mixture gives an alkaline reaction toward brilliant yellow test paper and a test portion of the mixture no longer reacts with R-salt to give a brownish-red coloration. The amount of sodium carbonate usually required is about 200 parts. After stirring the solution for about an hour, the dye is salted out by the addition of common salt, filtered off, dried, and ground to a powder.

The new dyestuff thus obtained is the sodium salt of an acid having most probably the following formula:

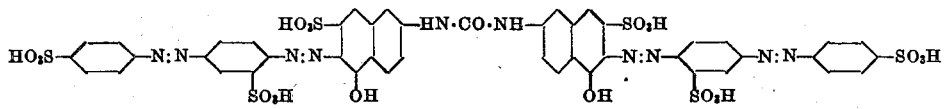

and in the dry and pulverized state is a reddish-brown powder soluble in water with a crimson color, soluble in concentrated sulfuric acid with a greenish-blue color which upon dilution with water changes to a crimson color, and soluble in concentrated hydrochloric acid with a reddish-violet color. The new dyestuff directly dyes cotton bluish red shades which are of excellent fastness to acids, to alkalies and to light, and which are capable of being discharged to a white with hydrosulfite. In a neutral Glauber's salt bath, it dyes cotton but leaves wool and silk almost unstained; in an acid bath it dyes silk and wool.

If in the above example, the aminoazobenzene disulfonic acid is replaced by an equivalent quantity of 2.3'-dimethyl-4'-aminoazobenzene disulfonic acid, which may be obtained by the direct sulfonation of 2.3'-dimethyl-4'-aminoazobenzene, there is produced a dyestuff which dyes cotton considerably bluer shades, and in a neutral Glauber's salt bath leaves wool and silk almost unstained. It dyes silk and wool in an acid bath. In the dry state it is a brownish powder soluble in water with a crimson color and in concentrated sulfuric acid with a bluish green color.

I claim:

1. The hereindescribed new azo dyestuffs obtainable by combining two molecular proportions of a diazotized aminoazodisulfonic acid of the benzene series, with one molecular proportion of 5.5'-dihydroxy-2.2'-dinaphthylurea-7.7'-disulfonic acid, which dyestuffs are, after being dried and pulverized, in the shape of their alkaline salts brown to red powders soluble in water with a crimson color, soluble in concentrated sulfuric acid with a bluish-green color; and dyeing cotton in a neutral bath bluish red shades, leaving wool and silk almost entirely unstained, and being discharged to a white with hydrosulfite,

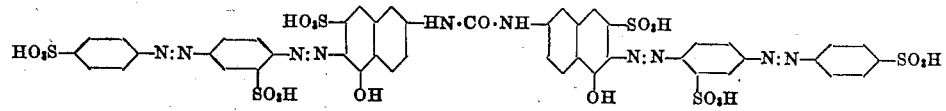

which in the dry and pulverized state and in the shape of its sodium salt is a reddish brown powder soluble in water with a crimson color, soluble in concentrated sulfuric acid with a greenish blue color which upon dilution with water changes to a crimson color, soluble in concentrated hydrochloric acid with a reddish violet color; and dyeing unmordanted cotton red shades in a neutral bath to the almost entire exclusion of wool or silk, and capable of being discharged with hydrosulfite.

2. The hereindescribed new azo dyestuff being the alkaline salt of an acid having most probably the following formula:

3. Materials with the new azo dyestuffs of claim 1.

4. Materials dyed with the new azo dyestuff of claim 2.

In testimony whereof I affix my signature.

JAMES P. PENNY.